Aug. 14, 1928.
W. FRIEDMAN
1,681,110
COOLING VENDING CONTAINER FOR DRINKS
Filed Aug. 12, 1927
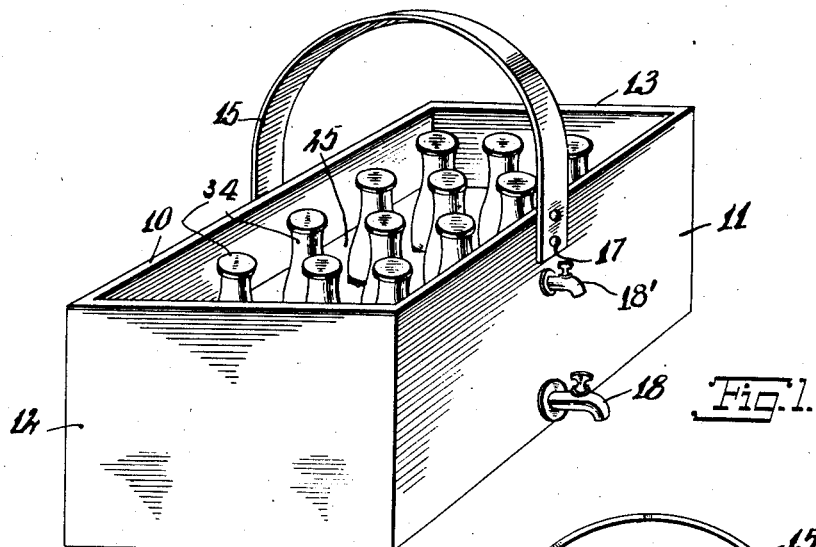
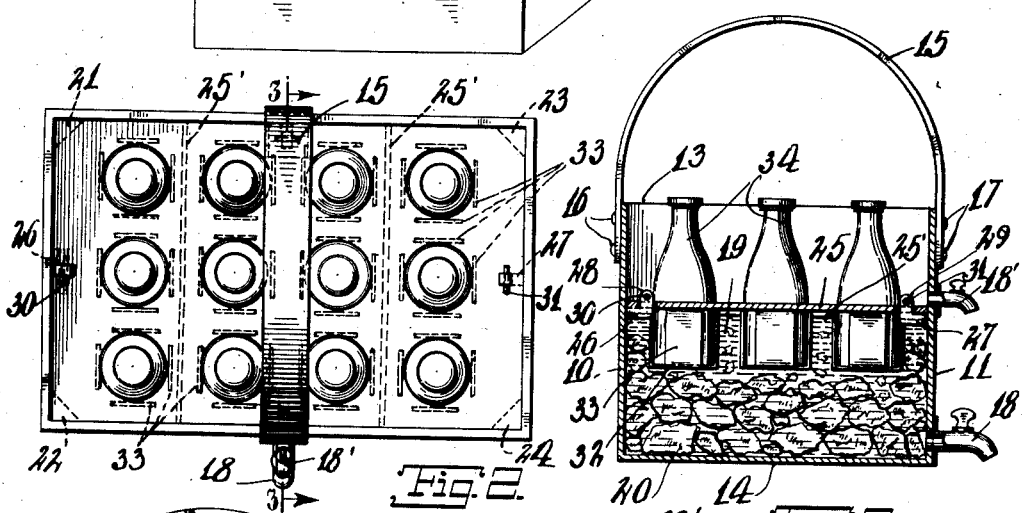
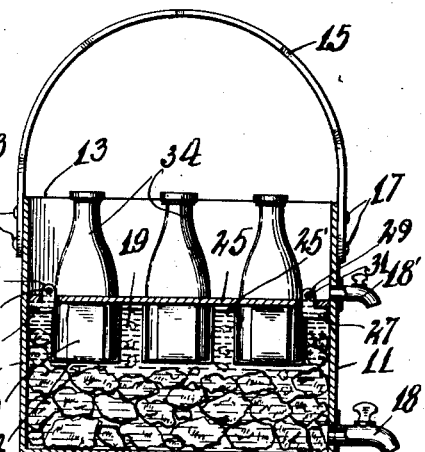
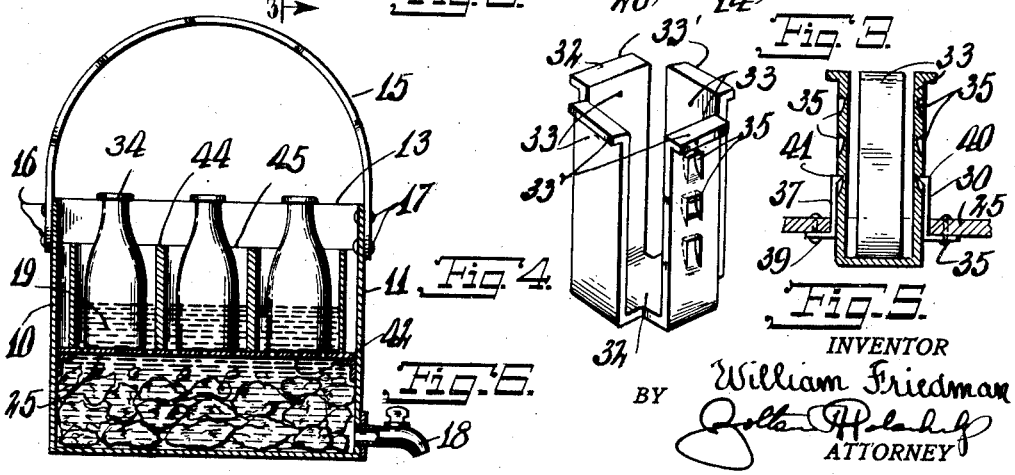
INVENTOR
William Friedman
BY
ATTORNEY Patented Aug. 14, 1928.

1,681,110

UNITED STATES PATENT OFFICE.

WILLIAM FRIEDMAN, OF NEW YORK, N. Y.

COOLING VENDING CONTAINER FOR DRINKS.

Application filed August 12, 1927. Serial No. 212,449.

This invention relates to a new and useful device in the nature of a cooling vending container for drinks, especially adapted to be carried by venders on foot, as a means of keeping soft drinks, soda, ginger ale, and the like, such as is put up in bottles, cold, so as to provide a cold refreshing drink. The container may also be used to carry other articles.

The object of the invention is to provide a container of the class described comprising certain adjustable features, hereinafter fully set forth and described, for the purpose of keeping the drinks cold, to accommodate bottles of various sizes, to hold the said bottles closer to the ice or for changing the relative size of the portions of the container.

A further object of the invention is to provide a container of novel construction and arrangement of parts hereinafter more fully described, claimed and illustrated in the accompanying drawing.

Fig. 1 is a perspective view of my improved container.

Fig. 2 is a top plan view thereof.

Fig. 3 is a transverse central sectional view thereof.

Fig. 4 is a perspective detail view of the bottle holder, illustrating a further development thereof.

Fig. 5 is a fragmentary sectional view illustrating the means of adjustably holding the said bottle holder in place therein.

Fig. 6 is a similar view to that shown in Fig. 3 illustrating a modification of my improved container.

As here embodied my improved container comprises a box-like member consisting of sides 10 and 11, ends 12 and 13, and a bottom 14, open at the top. The handle 15 is secured at its extremities, as at 16 and 17, by rivets, bolts, screws, or the like, to the upper central portion of the sides 10 and 11, and extends upwardly therefrom, so as to provide a ready and convenient means of carrying my improved container.

The usual faucet 18 is secured to the extreme lower portion of the side 11, adjacent to the bottom 14 so as to permit the water 19 from the melting of the ice 20, which is placed in cracked form, or in lumps, in the lower portion of my improved container, to be drawn from the said container, as is required to maintain the desired level of the said water 19 in my improved container. Another faucet 18' may be placed above the plate 24 to let the overflow of water flow out of the container. Lug members 21, 22, 23 and 24 are secured to the inner corners of my improved container, intermediate the bottom 14 and the open top thereof also supporting bars 25' are adapted to support the plate member 25 which slidably engages in the said container. The block members 26 and 27 are secured to the sides 10 and 11, and are positioned so as to engage the bottom portion of the plate member 25. The hook members 28 and 29 extend through the apertures in plate 25 and are adapted to receive pins 30 and 31 so as to removably hold the said plate members 25 securely in place in my improved container. The holders 32 are formed or bent upwardly as at 33, at the four sides thereof, and are secured to the bottom side of the plate member 25 by welding, brazing or the like. The latter described construction is such as will permit the bottles 34 to be inserted through apertures, preferably circular in shape, formed in the said plate member, the said bottles resting on and being supported by the said holders 32.

In Figs. 4 and 5 of the accompanying drawing, I have shown the elements 33 to be bent at their upper ends as at 33' so as to hold the holders 32 in position when slid into the apertures of plate members 25. I have also shown a plurality of indentations 35 formed in two of the opposite upwardly bent elements 33 of the holders 32. A pair of catches 36 and 37 are secured to the plate member 25, as at 38 and 39, respectively to the plate member 25, adjacent to the above mentioned apertures formed therein, to receive the said holders 32. The catches 36 and 37 are bent upwardly therefrom, and are provided with enlarged free extremities 40 and 41, respectively, adapted to engage in the said indentations 35 formed in the holders upwardly formed element 33 of the holders 32. The said catches 36 and 37 are constructed preferably of spring steel, so as to be urged inwardly so as to securely hold the said holders 32 in place therein.

The above described construction is such as will permit the said holders 32 to be held in any desired extended position. It is obvious that the said holders 32 may be raised or lowered, as is desired, to accommodate the amount of ice placed in the container and so as to hold the said bottles closer to the ice, and so as to accommodate bottles of various sizes. The said holders 32 may be used to hold small square pieces of cake, while the space between the bottoms of the holders 32 and the container bottom 14 may hold large uncut layers of cake. As the cake from the holders are sold, the layer of cake may be removed and cut up and placed in the holders. The container may be loaded to full capacity when the holders are fully extended as shown in Fig. 5, but in this condition the holders may project above the top of the container which is not very desirable. As the substances beneath the plate 25 is removed, the holders 32 may be moved to retracted positions. Obviously this applies also to bottles in the holders 32 and ice or other refrigerants beneath the holders and on the container bottom 14. More refrigerant may be stored in the container when the holders are extended than when retracted, and as the refrigerant becomes used up, the holders may be retracted.

In cases of use where bottles are placed in the holders and a liquid in the container 14, the side openings of the holders permit the liquid to surround the bottles for increasing the capacity of the container for holding the liquid.

In Fig. 6 of the accompanying drawing, I have shown the above mentioned plate member 25, having formed therein a plurality of apertures 42, adapted to permit the said water 19 from the ice 20 to come in contact with the said bottles 34. The plate member 25 is removably supported by the angle members 43 secured to the sides 10 and 11 of my improved container. Longitudinal and transverse members 44 and 45 or strips, have formed therein elongated openings adapted to permit the said longitudinal and transverse members to slidably engage each other, so as to provide partitions or spaces, adapted to receive the said bottles 34, so as to prevent the bottles from being broken.

Having thus described my invention, what I claim as new and desire to protect by Letters Patent of the United States is as follows:

1. In a container of the class described, a plate member disposed between the top and bottom extremities thereof, having apertures therein, socket members adjustably mounted in said apertures adapted to retain bottles in upright position, and catches mounted on said plate member adapted to engage in apertures in said holders for securing the latter in a predetermined position.

2. In a container of the class described, a plate member disposed between the top and bottom extremities thereof, having apertures therein, socket members each comprising a base portion and spaced apart integral side extension adjustably mounted in said apertures, outwardly disposed flanges on the upper extremities of said side extensions adapted to prevent passage of said socket members through said apertures, and catches mounted on said plate members engageable in notches in the side extensions of said socket members for retaining the latter in adjusted positions.

In testimony whereof I have affixed my signature.

WILLIAM FRIEDMAN.